United States Patent
Wooldridge et al.

(10) Patent No.: US 8,001,543 B2
(45) Date of Patent: Aug. 16, 2011

(54) DIRECT-MEMORY ACCESS BETWEEN INPUT/OUTPUT DEVICE AND PHYSICAL MEMORY WITHIN VIRTUAL MACHINE ENVIRONMENT

(75) Inventors: James L. Wooldridge, Fall City, WA (US); James J. Bozek, Bothell, WA (US)

(73) Assignee: International Business Machines Corporation, Armonk, NY (US)

( * ) Notice: Subject to any disclaimer, the term of this patent is extended or adjusted under 35 U.S.C. 154(b) by 1486 days.

(21) Appl. No.: 11/246,733

(22) Filed: Oct. 8, 2005

(65) Prior Publication Data
US 2007/0083862 A1 Apr. 12, 2007

(51) Int. Cl.
G06F 9/455 (2006.01)
G06F 12/00 (2006.01)

(52) U.S. Cl. ............................. 718/1; 711/112
(58) Field of Classification Search ............... 718/1
See application file for complete search history.

(56) References Cited

U.S. PATENT DOCUMENTS

| | | | | |
|---|---|---|---|---|
| 5,088,033 | A * | 2/1992 | Binkley et al. ............. | 703/24 |
| 5,515,474 | A * | 5/1996 | Deacon et al. ............. | 704/201 |
| 6,075,938 | A * | 6/2000 | Bugnion et al. ............. | 703/27 |
| 6,397,242 | B1 | 5/2002 | Devine et al. | |
| 6,725,289 | B1 * | 4/2004 | Waldspurger et al. .......... | 710/9 |
| 7,028,149 | B2 * | 4/2006 | Grawrock et al. ........... | 711/156 |
| 7,111,145 | B1 * | 9/2006 | Chen et al. ............... | 711/206 |
| 7,334,107 | B2 * | 2/2008 | Schoinas et al. ........... | 711/207 |
| 7,421,533 | B2 * | 9/2008 | Zimmer et al. ............ | 711/6 |
| 7,467,381 | B2 * | 12/2008 | Madukkarumukumana et al. ........... | 718/1 |
| 7,478,173 | B1 * | 1/2009 | Delco ........................ | 709/250 |
| 2002/0059268 | A1 | 5/2002 | Babaian et al. | |
| 2005/0039180 | A1 | 2/2005 | Fultheim et al. | |
| 2005/0076186 | A1 | 4/2005 | Traut | |
| 2005/0081199 | A1 | 4/2005 | Traut | |
| 2005/0132365 | A1 * | 6/2005 | Madukkarumukumana et al. ........... | 718/1 |
| 2005/0138620 | A1 * | 6/2005 | Lewites ..................... | 718/1 |
| 2007/0028244 | A1 * | 2/2007 | Landis et al. .............. | 718/108 |

OTHER PUBLICATIONS

EPO Search report in corresponding EPO patent application, BEA920050023EP1, 06 806 973.1-1243, dated Mar. 20, 2009.
K. Fraser et al., "Safe hardware access with the Xen virtual machine monitor," Proceedings of the 1st Workshop on Operating System and Architectural Support for the on demand IT InfraStructure (Oasis (2004)), cited in EPO Search report.

(Continued)

Primary Examiner — Van H Nguyen
Assistant Examiner — Adam Lee
(74) Attorney, Agent, or Firm — Thomas Tyson

(57) ABSTRACT

Direct memory access (DMA) is provided between input/output (I/O) devices and memory within virtual machine (VM) environments. A computing device includes an I/O device, an operating system (OS) running on a VM of the computing device, a device driver for the I/O device, a VM manager (VMM), I/O translation hardware, and a hardware abstraction component for the OS. The I/O translation hardware is for translating physical addresses of the computing device assigned to the OS to machine addresses of the I/O device. The hardware abstraction component and the VMM cooperatively interact to enable the device driver to initiate DMA between the I/O device and memory via the translation hardware. The OS may be unmodified to run on the VM of the computing device, except that the hardware abstraction component is particularly capable of cooperatively interacting with the VMM to enable the device driver to receive DMA from the I/O device.

23 Claims, 4 Drawing Sheets

OTHER PUBLICATIONS

Chinese Patent Office office action in counterpart Chinese patent application 200680036546.6, dated May 11, 2010. Note: This office action cites the Fraser article also cited by the European Patent Office, as submitted in the previously filed IDS of Jun. 7, 2009. Applicant submits the present IDS just to report the Chinese office action, to satisfy its obligation under Rule 97.

* cited by examiner

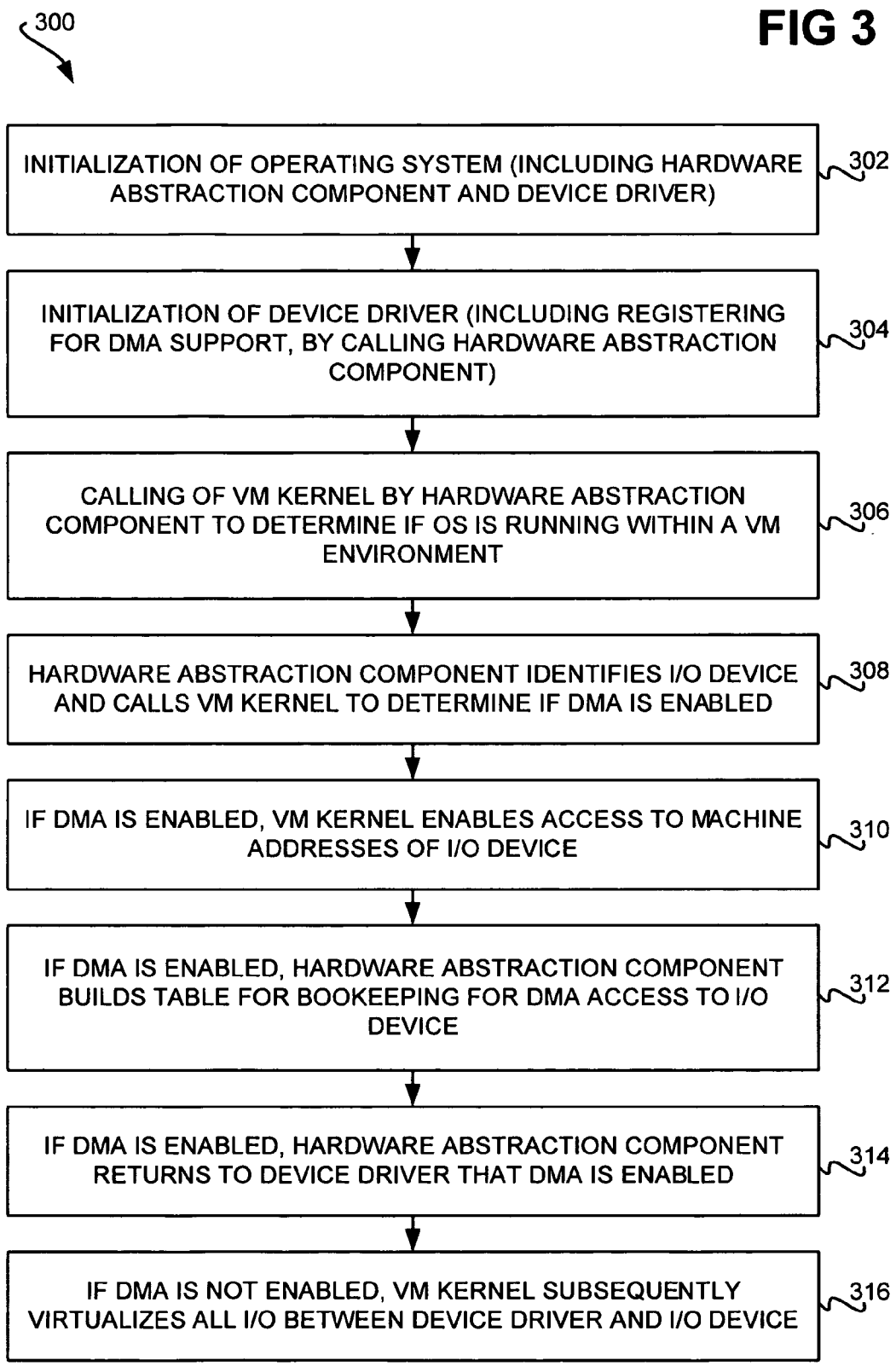

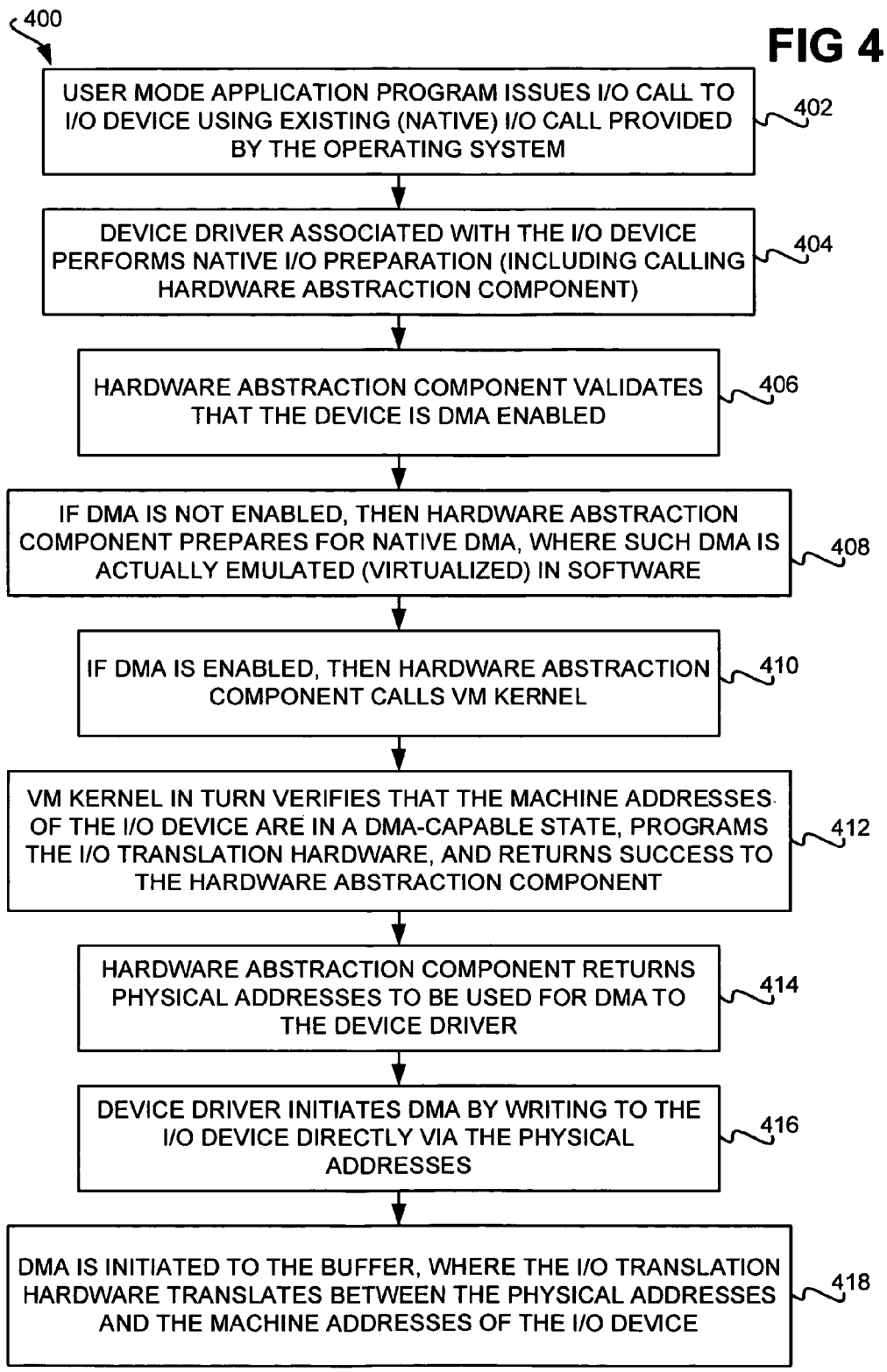

DIRECT-MEMORY ACCESS BETWEEN INPUT/OUTPUT DEVICE AND PHYSICAL MEMORY WITHIN VIRTUAL MACHINE ENVIRONMENT

FIELD OF THE INVENTION

The present invention relates generally to virtual machine environments, in which guest operating systems run within virtual machines of a computing device, and more particularly to direct memory access between input/output (I/O) devices and memory within such virtual machine environments.

BACKGROUND OF THE INVENTION

Historically, a single computing device ran a single operating system. Each computer user, for instance, was assigned his or her own client computing device, and that computing device ran an operating system in which the user could run application programs as desired. Similarly, a server computing device ran a single operating system that ran application programs.

However, this type of computer architecture has disadvantages. First, it is costly, because each computing device needs a complete assortment of processors, memory, and input/output (I/O) devices to properly function whether it is being utilized or not. Second, the use of this type of architecture can be inefficient. At any given time, a given computing device may not be performing work, and rather is sitting idle, waiting for a task to be performed during times when workloads increase.

Therefore, a technology has been developed in which more than one operating system is capable of running on a single computing device, sharing at least the memory and the processors of the computing device. Such technology is referred to as virtualization. With virtualization, a given computing device has a number of virtual machines (VM's), or VM environments, where a guest operating system is run in each VM or VM environment. Therefore, guest operating systems for multiple computer users can be run simultaneously on a single computing device, such as a single server computing device. When workload demands are high, more VM's can be instantiated and run. When workloads are low, VM's can be suspended.

One type of virtualization technology is referred to as full virtualization. Full virtualization has the advantage of being able to be employed with "off-the-shelf" operating systems, with no modification made to these operating systems. This is particularly advantageous with respect to x86-based operating systems, such as versions of the Microsoft Windows® operating system and versions of the Linux operating system. Thus, a fully virtualized environment can be set up in which different instances of a Microsoft Windows® operating system and/or a Linux operating system can be run simultaneously on the same computing device, within different VM's (isolated from one another), without having to modify the operating systems However, full virtualization has a significant disadvantage. In full virtualization, I/O access to I/O devices of the computing device, by a guest operating system running within a VM environment, is typically emulated. That is, the guest operating system does not have direct access to I/O devices, but rather the I/O requests from the operating system are sent to a VM manager, or hypervisor, which manages all the IO requests, processes them accordingly and sends them to the I/O devices as desired. Thus, full virtualization typically incurs a performance penalty during IO because the VM manager must monitor and emulate all IO operations on behalf of all VM's.

Another type of virtualization technology is referred to as para-virtualization. In para-virtualization, operating system software leverages programmatic interfaces exposed by the hypervisor to perform IO and DMA operations. Often, in a para-virtualized model, a special partition or VM is created to manage all IO. In a para-virtualized model, there is typically very little, if any, emulation, thus enabling a "thinner" or more lightweight hypervisor. Hence, para-virtualization has the advantage of providing for significantly better I/O performance than does full virtualization. For environments in which I/O performance is critical, para-virtualization can be a desirable solution.

However, para-virtualization suffers from a very significant disadvantage in that guest operating systems have to be customized, or completely rewritten, in order to run within para-virtualized environments. That is, an "off-the-shelf" operating system, such as versions of the Microsoft Windows® operating system and versions of the Linux operating system, cannot run within a para-virtualized environment without significant and fundamental modification.

Within fully virtualized systems there is considerable overhead associated with monitoring and emulation I/O purely in software without hardware assistance. In this case, hardware assistance refers to a set of hardware translation tables that enable secure address translation between a single DMA device and memory within a VM. Currently, the x86 processor architecture does not itself incorporate DMA translation capabilities. However, some x86-based systems do contain hardware features that enable the ability to translate, or remap DMA address spaces within the chipset used in the platform architecture.

SUMMARY OF THE INVENTION

The present invention relates to direct memory access (DMA) between input/output (I/O) devices and physical memory within virtual machine (VM) environments. A computing device of an embodiment of the invention includes an I/O device, an operating system (OS) running on a VM of the computing device, a device driver for the I/O device running in the VM, a VM manager (VMM), or hypervisor, running on the computing device, I/O translation hardware, and a hardware abstraction component for the OS running in the VM. The I/O translation hardware is for translating physical addresses of the computing device assigned to the OS to machine addresses between the I/O device and physical memory. The hardware abstraction component and the VMM cooperatively interact to enable access to system memory from the DMA I/O device via the I/O translation hardware.

It is noted that an I/O device as described herein in actuality incorporates two components: the device itself, such as the storage device itself, and an I/O controller for the device that manages access to and from the device. The I/O controller manages DMA to and from memory and the device. In one embodiment, two basic I/O access approaches are enabled. First, the VM manager enables operating system access to the I/O controller, and thus allows the operating system to program the controller directly. Second, the VM manager leverages the I/O translation hardware to enable the I/O controller to directly address the memory space allocated to the guest operating system. The first type of access approach does not depend on the I/O translation hardware to enable the operating system to access the I/O controller, and this type of access is known as programmed I/O, as opposed to DMA, and the translation of this address space in handled by the x86 page tables. By comparison, the second access approach enables the I/O controller to read and write memory directly, and this is the crux of the DMA benefits provided by embodiments of the invention.

Thus, the I/O controller is not actually the target of a DMA operation, but rather is an initiator of a DMA operation where the memory allocated to the operating system and the device itself are targets. The OS may be unmodified to run on the VM of the computing device, except that the hardware abstraction component is particularly capable of being able to cooperatively interact with the VMM. That is, unlike para-virtualized environments in which fundamental changes need to be made to the OS, the virtualized environment of the present invention does not require fundamental changes to be made to the OS. Rather, just a new hardware abstraction component for the OS needs to be designed, and nearly all OS's, such as versions of the Microsoft Windows® operating system and versions of the Linux operating system, enable third parties to provide new hardware abstraction components for their otherwise unchanged OS's. Stated another way, whereas para-virtualized environments require changes to be made to OS's, the virtualized environment of the invention does not require widespread changes to be made to OS's, and instead just requires changes to be made to hardware abstraction components, which localizes access to the DMA hardware at a relatively low level.

A computing device of another embodiment of the invention includes one or more I/O devices, one or more VM environments, I/O translation hardware, and a VMM. Each VM environment includes an OS, a device driver for the I/O device, and a hardware abstraction component for the OS. The I/O translation hardware translates physical addresses assigned to the OS of each VM environment to machine addresses of the I/O devices for DMA between at least one of the I/O devices and the physical memory of each VM environment. The VMM manages the VM environments, and is capable of permitting DMA between at least one of the I/O devices and the memory of a VM environment, and is capable of denying DMA between the I/O devices and the memory of a VM environment.

Thus, some of the OS's of some of the VM environments may have DMA for some of the I/O devices, and other of the OS's of other of the VM environments may not have DMA for these I/O devices. Stated another way, the VMM allows on a per-OS basis whether the device driver for a given I/O device and of a given OS allows DMA between an I/O device or virtualized I/O access to the I/O device. In this way, the virtualized environment provided by at least some embodiments of the invention can be completely virtualized, so that new hardware abstraction components are not needed for "off-the-shelf" and unmodified OS's to run within the environment. The same virtualized environment can, however, not be completely virtualized, so that for OS's that have such new hardware abstraction components and for which high I/O performance is required can have DMA.

The virtualized environment therefore can support "mixed-and-matched" operating systems, where some operating systems leverage DMA and some operating systems have virtualized I/O access to these I/O devices. The virtualized environment of at least some embodiments of the invention can thus offer dynamic virtualization, ranging from full virtualization for highest compatibility to less-than-full virtualization for highest performance, on both a per-OS basis and a per-I/O device basis. The less-than-full virtualization provided is still more advantageous than para-virtualization, because the OS's do not have to be fundamentally modified, and rather just their hardware abstraction components need to be modified. That is, the less-than-full virtualization provided by these embodiments of the invention still offer the same advantages over para-virtualization that have been noted above.

A method of an embodiment of the invention is for DMA between physical memory and an I/O device of a computing device within a VM environment running within the computing device. A VMM running on the computing device programs I/O translation hardware to translate physical addresses of the computing device assigned to the VM environment to machine addresses of the VM. A device driver for the I/O device running within the VM environment thus can initiate DMA to/from the I/O device, such that the I/O translation hardware translates the physical addresses provided by the device driver to the machine addresses of the VM's physical memory, and vice-versa.

In a method of another embodiment of the invention, a device driver running within a VM environment of a computing device calls a hardware abstraction component also running within the VM environment to setup DMA for an I/O device of the computing device. The hardware abstraction component determines whether DMA for the I/O device is enabled by communicating with a VMM on the computing device. If DMA is not enabled, the VMM emulates all I/O between the device driver and the I/O device in software of the VMM. If DMA is enabled, the VMM programs I/O translation hardware of the computing device to translate physical addresses of the computing device assigned to the VM environment to machine address of the VM, so that (non-emulated) DMA is capable of occurring between the I/O device and memory.

Still other embodiments, aspects, and advantages of the invention will become apparent by reading the detailed description that follows, and by referring to the accompanying drawings.

BRIEF DESCRIPTION OF THE DRAWINGS

The drawings referenced herein form a part of the specification. Features shown in the drawing are meant as illustrative of only some embodiments of the invention, and not of all embodiments of the invention, unless otherwise explicitly indicated, and implications to the contrary are otherwise not to be made.

FIG. 3 is a flowchart of a method for initializing I/O access, be it virtualized DMA or non-virtual DMA, between a VM environment and an I/O device, according to an embodiment of the invention.

FIG. 4 is a flowchart of a method for achieving I/O access, be it virtualized DMA or non-virtual DMA, between a VM environment and an I/O device, according to an embodiment of the invention.

DETAILED DESCRIPTION OF THE DRAWINGS

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

Figure 1:
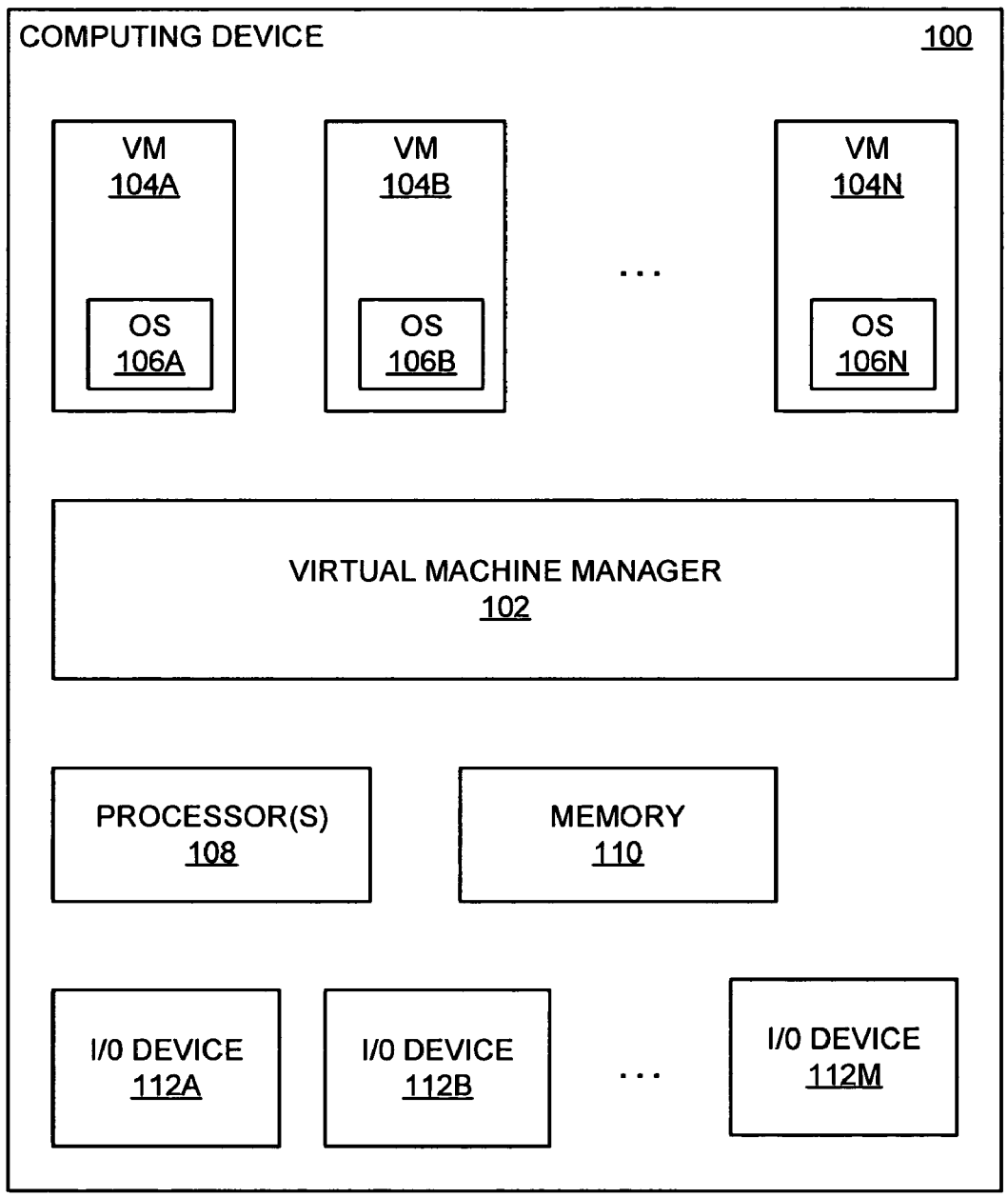
FIG. 1 is a diagram of a computer architecture for implementing a virtual machine (VM) environment within a computing device, according to an embodiment of the invention.

FIG. 1 shows a computing device 100, according to an embodiment of the invention. The computing device 100 includes a virtual machine (VM) manager 102, and a number of virtual machines (VM's) 104A, 104B, ..., 104N, collectively referred to as the VM's 104. The VM's 104 may also be referred to as VM environments. The VM's 104 have correspondingly running on them operating systems (OS's) 106A, 106B, ..., 106N, collectively referred to as the OS's 106.

Each of the VM's 104 is a virtualized environment that enables a corresponding one of the OS's 106 to run on it as if the OS in question were the only OS running on the computing device 100. In this way, a number of OS's 106 can run on the computing device 100, within a number of VM's 104. That is, the VM's 104 are VM environments in that each of the VM's 104 appears to software running within the VM's 104 as a traditional hardware environment, such as the sole hardware environment of the computing device 100.

The VM manager 102 manages the VM's 104. That is, the VM manager 102 allows for administration of the individual VM's 104, such as their startup, shutdown and maintenance. When a new VM is desired to be run on the computing device 100, it is started from within the VM manager 102, and when an existing VM is desired to be shutdown, it is shutdown from within the VM manager 102. The VM manager 102 is also commonly referred to as a hypervisor.

The computing device 100 includes hardware, such as one or more processors 108, memory 110, and input/output (I/O) devices 112A, 112B, ..., 112M, collectively referred to as the I/O devices 112. As can be appreciated by those of ordinary skill within the art, the computing device 100 may have other hardware, in addition to and/or in lieu of that depicted in FIG. 1. The memory 110 is shared by the VM's 104. The memory 110 is addressable by a physical address space, having a range of physical memory addresses. Each of the VM's 104 in one embodiment is assigned a section of the physical address space, such that each of the VM's 104 has assigned thereto a portion of the physical memory addresses of the memory 110.

The processors 108 may be shared by the VM's 104, or each of the processors 108 may be utilized by a single one of the VM's 104. In one embodiment, the processors 108 are x86 processors, and thus are processors that are not typically well situated for virtualization. That is, x86 processors are processors that do not inherently provide for virtualization, and thus do not have virtualization-specific processor commands, or opcodes. Therefore, embodiments of the invention can be employed with processors that do not provide for virtualization. Such embodiments can be implemented in relation to x86 operating systems, such as versions of the Microsoft Windows® operating system, and versions of the Linux operating system.

The I/O devices 112 can include storage devices, such as disk drive devices, communication devices, such as network adapters, output devices, such as display devices and their conjoining display device adapters, as well as other types of I/O devices, as can be appreciated by those of ordinary skill within the art. As will be described in more detail later in the detailed description, each of the I/O devices 112 may be dedicated, or reserved, to one of the VM's 104 in one embodiment, or it may be shared by more than one of the VM's 104 in another embodiment. For example, a given storage device having a storage device interface adapter may be dedicated, or reserved, to one of the VM's 104, such that only this VM can use the storage device, or it may be shared by more than one of the VM's 104, such that all of these VM's can use the storage device.

Furthermore, for each of the I/O devices 112 to which a given one of the VM's 104 has access, the VM in question may have one of two different types of access to this I/O device. First, the VM may have virtualized I/O access to the I/O device, such as virtualized direct memory access (DMA) with the I/O device. In virtualized access, I/O requests from the VM and I/O responses from the I/O device pass through the VM manager 102. The VM manager 102, in other words, handles all I/O access between the VM and the I/O device where the access is virtualized.

Second, the VM may have DMA with the I/O device. In DMA, I/O requests from the VM and I/O responses from the I/O device do not pass through the VM manager 102. Rather, such requests and responses pass directly from the VM in question to the I/O device in question, and vice-versa. True DMA provides for better performance than virtualized I/O access, but does require a specialized hardware abstraction component in order to occur, whereas virtualized I/O access does not, as is described in more detail later in the detailed description.

Figure 2:
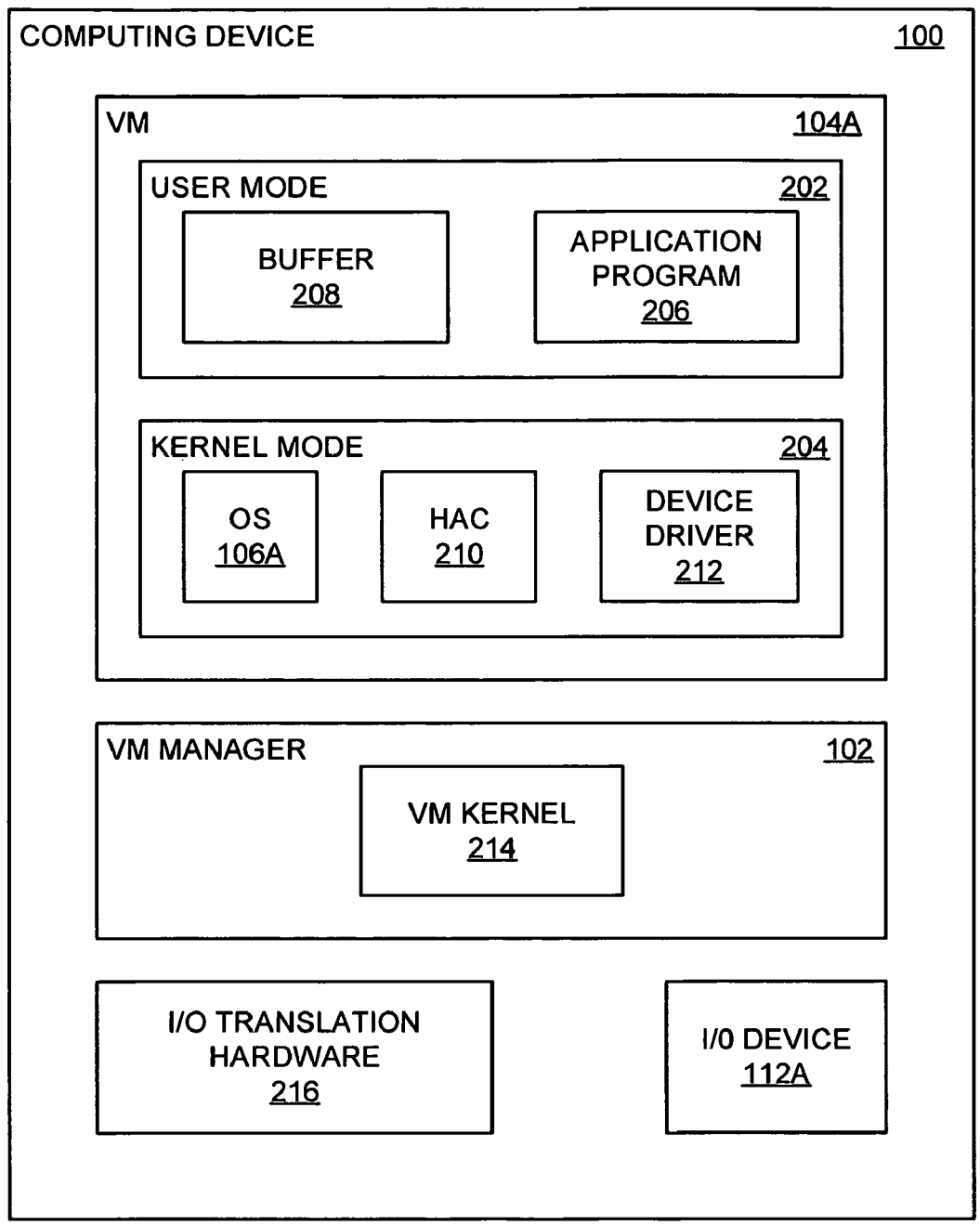
FIG. 2 is a diagram of an architecture of a computing device for achieving direct memory access (DMA) within a VM environment from an input/output (I/O) device of the computing device, according to an embodiment of the invention.

FIG. 2 shows a portion of the computing device 100 in more detail, according to an embodiment of the invention. In FIG. 2, just a single VM 104A is depicted, and a single I/O device 112A is depicted, as representative of all the VM's 104 and of all the I/O devices 112. Furthermore, the processors 108 and the memory 110 are not shown in FIG. 2 for illustrative convenience and clarity. An additional piece of hardware, I/O translation hardware 216, is present in the computing device 100 in the embodiment of FIG. 2, however. The individual components of the computing device 100 of FIG. 2 are now described, and then the way they function and interrelate with one another is described in relation to two methods.

The VM 104A is divided into a user mode 202 and a kernel mode 204. Application programs, such as the application program 206, run in the user mode 202, whereas the OS 106A for the VM 104A runs in the kernel mode 204. The user mode 202 and the kernel mode 204 can be considered as the two operating modes of the VM 104A. Application programs that run in the user mode 202 have access only to an address space provided within the user mode 202, so that when a user-mode process requires data that resides in the kernel mode 204, it calls a system service provided by the OS 106A to obtain that data.

The distinction between user mode 202 and kernel mode 204 is made so that a certain amount of protection, or security, can be afforded the critical system processes that run in the kernel mode 204, so that these processes may not be able to be directly affected from within the user mode 202. The kernel mode 204 thus contains the kernel of the VM 104A, which is the fundamental part of the VM 104A, including the OS 106A, that provides basic services to the application programs running within the user mode 202. Access to the I/O device 112A, for instance, from within the user mode 202 is accomplished via the kernel mode 204 of the VM 104A.

Besides the application program 206, a representative buffer 208 is depicted as residing within the user mode 202. The buffer 208 stores the data that is sent from the application program 206 to the I/O device 112A, and vice-versa, where DMA between the program 206 and the I/O device 112A is afforded. The utilization of this buffer 208 is described in more detail later in the detailed description.

Besides the OS 106A, the kernel mode 204 also includes a hardware abstraction component 210 for the OS 106A, and a device driver 212 for the I/O device 112A. The hardware abstraction component 210 may in some situations be considered a part of the OS 106A. However, the hardware abstraction component 210 is a component separate from other components of the OS 106A, and resides at a significantly lower level relative to other parts of the OS 106A. Therefore, it can be said that the OS 106A is unmodified even though the hardware abstraction component 210 has been unmodified, since the component 210 is modularized.

The hardware abstraction component 210 abstracts the hardware of the computing device 100, such as the I/O device 112A, for the OS 106A. In other words, the component 210 hides the details of interfacing with the hardware of the computing device 100 from the OS 106A. The component 210 thus functions similarly to an application-programming interface (API), and is used by programmers to write device-independent application programs. A programmer, for instance, just has to write code that stores data to a storage device, and does not have to write code for each particular type of storage device that may be present within the computing device 100. The component 210 in some types of operating systems, such as versions of the Microsoft Windows® operating system, is referred to as a hardware abstraction layer.

Whereas the hardware abstraction component 210 provides a general level of abstraction of all the hardware of the computing device 100, the device driver 212 enables the OS 106A and the application program 206 to communicate with a particular piece of hardware. The device driver 212 is particularly for the I/O device 112A, and contains the code that is specifically written to communicate with the I/O device 112A driver," it is a program routine that links the operating system to a peripheral device. The device driver 212 thus contains the precise machine language necessary to interact with the I/O device 112A.

The hardware abstraction component 210 and the device driver 212 act in concert to provide access to the I/O device 112A. As is described in more detail later in the detailed description, the device driver 212 can be said to register with the hardware abstraction component 210, and in this way the I/O device 112A is revealed to the OS 106A and thus to the application program 206 running in the user mode 202 of the VM 104A. It is noted that the device driver 212, as afforded by the hardware abstraction component 210 and indeed ultimately the VM manager 102, provide DMA or virtualized access to the I/O device 112A.

The VM manager 102 includes a particular component that is relevant here, the VM kernel 214. The VM kernel 214 is the kernel 214 of the VM manager 102, and for the purposes herein provides the necessary routines for the access to be made to the I/O device 112A from within the VM manager 102. The VM kernel 214 furthermore provides the necessary routines for setting up DMA between the I/O device 112A and the VM 104A, or for providing virtualized I/O access to the I/O device 112A from within the VM 104A.

The VM kernel 214 interacts with the hardware abstraction component 210 to enable DMA for the I/O device 112A, via the device driver 212, where such DMA to within the VM 104A from the I/O device 112A is authorized. Furthermore, where such DMA is not authorized the VM kernel 214 acts to virtualize I/O access from within the VM 104A to the I/O device 112A, as may be considered conventional. It can be appreciated why virtualized I/O access is slower than non-virtualized DMA, because virtualized I/O access means that all access from within the VM 104A must pass through VM kernel 214 of the VM manager 102 before proceeding to the I/O device 112A, and thus all such I/O access is first virtualized in software.

The I/O translation hardware 216 translates machine addresses of the I/O device 112A to physical addresses of the memory 110 of the computing device 100, and vice-versa. This is necessary for DMA to occur to within the VM 104A from the I/O device 112A. That is, the machine addresses of the I/O device 112A encompass the address space of the computing device 100 that is dedicated, or reserved, to the I/O device 112A. For customary DMA in a non-VM environment, DMA can be achieved by having an application program, through a device driver, to communicate directly to these machine addresses.

However, in a VM environment like that of the embodiment of FIG. 2, the address space assigned to the VM 104A may not include the machine addresses of the I/O device 112A, but rather includes a portion of the physical addresses of the memory 110 of the computing device 100. Therefore, when the device driver 212 is granted DMA with respect to the I/O device 112A via the hardware abstraction component 210 cooperatively interacting with the VM kernel 214, such DMA is nevertheless accomplished, from the perspective of the VM 104A, not via the machine addresses of the I/O device 112A, but rather via corresponding physical addresses.

Therefore, the I/O translation hardware 216 translates the machine addresses of the I/O device 112A to the physical addresses assigned to the VM 104A, on the fly, as DMA occurs. Such translation may occur either upstream, from the VM 104A to the I/O device 112A, downstream, from the I/O device 112A to the VM 104A, or both upstream and downstream. An example of such I/O translation hardware 216 is that which is available from International Business Machines, Inc., of Armonk, N.Y., as part of IBM's EXA architectural platform.

The embodiment of FIG. 2 can thus provide virtualized I/O access to the I/O device 112A from within the VM 104A, as is customary, and where such I/O access is virtualized in software by the VM kernel 214, and/or can provide DMA from the I/O device 112A within the VM 104A. In the latter instance, the I/O translation hardware 216 is leveraged to enable the OS 106A to initiate DMA directly from the I/O device 112A. The I/O translation hardware 216 thus effectively enables isolated or contained DMA, in that it controls the physical address aperture, or space, from and to which the OS 106A can DMA. The hardware abstraction component 210 is leveraged to implement and isolate the I/O translation interfaces to provide such DMA, so that the OS 106A itself does not have to be modified, but can instead be an "off-the-shelf" OS.

Furthermore, the VM kernel 214 provides a very minimal set of hypervisor calls, so that the hardware abstraction component 210 calls the VM kernel 214 to determine whether DMA is authorized for the VM 104A or not. If DMA is authorized, the component 210 informs the device driver 212 that such DMA can be accomplished, and the VM kernel 214 programs the I/O translation hardware 216 to properly translate the machine addresses of the I/O device 112A to the physical addresses assigned to the VM 104A, and vice-versa. In at least this sense, the hardware abstraction component 210 and the VM kernel 214 interactively cooperate to provide DMA between the I/O device 112A and memory within the VM 104A.

The VM kernel 214 thus provides hybrid virtualization. First, the VM kernel 214 can provide DMA for the I/O device 112A, such that the hardware abstraction component 210 has to be written or modified to take advantage of such DMA when requested by the device driver 212, although the OS 106A does not need to be modified. Second, the VM kernel 214 can virtualize I/O access to the I/O device 112A, where the hardware abstraction component 210 does not have to be rewritten or modified. Such virtualized I/O access may be considered virtualized DMA in one embodiment.

FIG. 3 shows a method 300 for initializing DMA between the VM 104A and the I/O device 112A, as part of a broader initialization of the OS 106A within the VM 104A, according to an embodiment of the invention. The OS 106A initializes as usual (302), including initialization of the hardware abstraction component 210 and the device driver 212 for the I/O device 112A (as to the OS 106A). During initialization of the device driver 212 (304), the device driver 212 attempts to register for DMA support relative to the I/O device 112A, by appropriately calling the hardware abstraction component 210 to register for DMA. This may more generally be considered as the device driver 212 calling the hardware abstraction component 210 to setup access to the I/O device 112A.

Next, the hardware abstraction component 210 calls the VM kernel 214, and more generally calls the VM manager 102, to determine if the OS 106A is running within a VM environment (306), such as the VM 104A. That is, just the hardware abstraction component 210 has knowledge that the OS 106A is running within the VM 104A. The OS 106A does not know that it is running within the VM 104A. This is in contradistinction to para-virtualized environments, in which an OS is specifically modified to know that it is running within a VM. Thus, in embodiments of the invention, the OS 106A does not have to be modified to run within the VM 104A, even where DMA is provided for between the device driver 212 and the I/O device 112A. Because the OS 106A is indeed running within the VM 104A, the VM manager 102 (i.e., the VM kernel 214) returns the fact that the OS 106A is running within a VM environment.

The hardware abstraction component 210 next identifies the I/O device 112A, and calls the VM kernel 214 (and more generally the VM manager 102) to determine if DMA is enabled for the I/O device 112A (308). Identification of the I/O device 112A is by Peripheral Component Interface (PCI) bus, device, and/or function, as can be appreciated by those of ordinary skill within the art. The VM kernel 214 is provided with this information when the component 210 calls the VM kernel 214 to determine whether DMA is enabled for the I/O device 112A, so that the VM kernel 214 can also appropriately identified the I/O device 112A that is the subject of the inquiry from the component 210. This may also be generally considered the calling of the VM kernel 214 to set up DMA of the I/O device 112A for the device driver 212.

If DMA is enabled (i.e., authorized or permitted) for the I/O device 112A, the VM kernel 214 enables access by the device driver 212 and the hardware access component 210 to the machine addresses of the I/O device 112A (310). Access to the machine addresses of the I/O device 112A is allowed via access to corresponding physical addresses that have been assigned to the VM 104A. As has been described, the I/O translation hardware 216 translates the machine addresses of the I/O device 112A to these physical addresses, and vice-versa. This part 310 of the method 300 may also be generally considered as enabling DMA for the I/O device 112A.

Next, assuming again that DMA is enabled for the I/O device 112A, the hardware abstraction component 210 builds a table for bookkeeping of the DMA to the I/O device 112A via the device driver 212 (312). This is conventional for DMA, as can be appreciated by those of ordinary skill within the art. The only difference here is that the DMA is accomplished within a virtualized environment, between a device driver 212 running in a VM 104A and an I/O device 112A. Furthermore, where DMA is enabled for the I/O device 112A, the hardware abstraction component 210 returns to the device driver 212 that DMA has been enabled (314), so that the device driver 212 can receive DMA from the I/O device 112A However, if DMA is not enabled for the I/O device 112A, then the VM kernel 214 of the VM manager 102 subsequently virtualizes all I/O between the device driver 212 and the I/O device 112A (316). Such virtualization is accomplished in software, and may be considered virtualized DMA in one embodiment of the invention, in that such "DMA" is in fact emulated in software. Such virtualization I/O access is also accomplished where the hardware access component 210 has not been modified or written to take advantage of DMA between the device driver 212 of the VM 104A and the I/O device 112A. That is, an "off-the-shelf" hardware access component 210 may not know to access the VM kernel 214 whether DMA is authorized, and thus always return to the device driver 212 that no DMA is enabled, such that all I/O access with the I/O device 112A is virtualized in software by the VM kernel 214 of the VM manager 102.

FIG. 4 shows a method 400 for actually performing DMA between the VM 104A and the I/O device 112A, where the initialization of the method 300 has already been performed, according to an embodiment of the invention. The user mode application program 206 issues an I/O call to the I/O device 112A using an existing (i.e., native) I/O call provided by the OS 106A (402). That is, the application program 206 does not have to use any special type of I/O call in order to achieve DMA with the I/O device 112A. Similarly, the OS 106A does not have to expose any special type of I/O call in order to allow DMA with the I/O device 112A within the VM 104A. Rather, the standard I/O calls of the OS 106A are employed, such that the OS 106A does not have to be modified in order to achieve DMA with the I/o device 112A within the VM 104A.

Next, the device driver 212 that is associated with the I/O device 112A performs native I/O preparation for achieving DMA with the I/O device 112A (404). Such native I/O preparation includes calling the hardware abstraction component 210 as is customary, such that the device driver 212 also does not have to be modified to take advantage of DMA to the I/O device 112A within the VM 104A. Calling the component 210 is accomplished in order to build a list of physical addresses within the device driver 212 that correspond to the buffer 208 in which the results of DMA will be placed, as can be appreciated by those of ordinary skill within the art.

The hardware access component 210 in turn validates that the I/O device 112A is indeed DMA enabled (406). For instance, the component 210 may reference a table that has been constructed earlier (such as a part of the method 300 that is not depicted specifically in FIG. 3), and which lists all the I/O devices for which DMA has been enabled. Validation may also be accomplished by communicating with the VM manager 102, instead of referencing a table.

It is noted that even if DMA within the auspices of the VM 104A is not enabled, the hardware abstraction component 210 prepares for what is referred to as native DMA (408), where such native DMA is virtualized, or emulated, in software by the VM kernel 214 of the VM manager 102. That is, the component 210 prepares for DMA in this case as it would normally if it were not specially written to provide DMA within the VM 104A within the auspices of embodiments of the invention, as is the case where the component 210 is unmodified and "off the shelf." In such instances, the hardware access component 210 prepares for DMA as is customary and conventional vis-à-vis the device driver 212, such that the "DMA" in this respect is ultimately emulated or virtualized by the VM kernel 214.

Such preparation for DMA in part 408 of the method 400, even where actual DMA cannot be provided, is important for two reasons. First, it allows the VM manager 102, such as the VM kernel 214, to determine which of the VM's 104 are allowed to actually receive DMA from the I/O device 112A. In other words, even if a given VM is not allowed to actually receive DMA from the I/O device 112A, the VM is still able to communicate with the I/O device 112A, via virtualized or emulated DMA within the VM manager 102. Second, it can allow for hardware access components to be utilized in relation to embodiments of the invention that are not particularly modified to enable actual DMA from the I/O device 112A. Again, in other words, even if a given hardware access component cannot take advantage of actual DMA with the I/O device 112A, the VM of which this component is a part is still able to communicate with the I/O device 112A, via virtualized or emulated DMA within the VM manager 102, in software.

If true DMA is enabled, then the hardware abstraction component 210 calls the VM kernel 214 (410). In this call, the hardware abstraction component 210 identifies the I/O device 112A with which DMA is to be achieved. In response, the VM kernel 214 of the VM manager 102 verifies that the machine addresses of the I/O device 112A are in a DMA-capable state (412), as can have been accomplished in the method 300 (and that is not specifically shown in FIG. 3). Furthermore, the VM kernel 214 programs the I/O translation hardware 216. Specifically, the VM kernel 214 indicates to the hardware 216 which of the physical addresses assigned to the VM 104A correspond to the machine addresses of the I/O device 112A, so that the I/O translation hardware 216 is able to translate the physical addresses to the machine addresses, and vice-versa. The VM kernel 214 finally indicates to the component 210 that success has been achieved in verifying the machine addresses of the I/O device 112A and in programming the I/O translation hardware 116.

The hardware abstraction component 210 then returns the physical addresses to be used for DMA by the device driver 212 (414). These physical addresses may be returned as a list, and are used for or as the buffer 208. Thus, the device driver 212 can initiate DMA by writing to the I/O device 112A directly via the physical addresses provided (416). DMA is then initiated from the I/O device 112A to the buffer 208 via these same physical addresses (418). The I/O translation hardware 216 translates the physical addresses to the machine addresses of the I/O device 112A upstream, from the device driver 212 to the I/O device 112A in part 416, downstream, from the I/O device 112A to the buffer 208 in part 418, or both upstream and downstream. That is, parts 416 and 418 can be more generally referred to as DMA'ing between the I/O device 112A and memory within the VM 104A.

It is noted that, although specific embodiments have been illustrated and described herein, it will be appreciated by those of ordinary skill in the art that any arrangement calculated to achieve the same purpose may be substituted for the specific embodiments shown. This application is thus intended to cover any adaptations or variations of embodiments of the present invention. Therefore, it is manifestly intended that this invention be limited only by the claims and equivalents thereof.

We claim:

1. A computing device comprising:
   an input/output (I/O) device;
   a guest operating system (OS) running on a virtual machine (VM) of the computing device;
   a device driver for the I/O device running on the VM;
   a VM manager (VMM) running on the computing device;
   I/O translation hardware that is part of the computing device and that is separate from both the VMM and the I/O device, the I/O translation hardware to translate physical addresses of the computing device assigned to the OS to machine address of the I/O device; and,
   a hardware abstraction component for the OS, the hardware abstraction component running on the VM, the hardware abstraction component and the VMM cooperatively interacting to enable the device driver to receive direct-memory access (DMA) from the I/O device via the I/O translation hardware, such that neither the hardware abstraction component nor the VMM alone enable the device driver to receive the DMA from the I/O device via the I/O translation hardware, wherein the OS is unmodified to run on the VM of the computing device except for the hardware abstraction component being capable of cooperatively interacting with the VMM to enable the device driver to have DMA from the I/O device.

2. The computing device of claim 1, wherein the VMM comprises a VM kernel that interacts with the hardware abstraction component to enable the device driver to have DMA from the I/O device via the I/O translation hardware.

3. The computing device of claim 1, wherein the VMM is capable of permitting DMA from the I/O device to the device driver and of denying DMA from the I/O device to the device driver.

4. The computing device of claim 3, wherein the VMM is to deny DMA from the I/O device to the device driver by instead virtualizing all I/O between the device driver and the I/O device in software of the VMM.

5. The computing device of claim 1, wherein the I/O device is reserved for the VM of the computing device and is unable to DMA to other VM's of the computing device.

6. The computing device of claim 1, wherein the I/O device is shared by the VM of the computing device with other VM's of the computing device for DMA.

7. A computing device comprising:
   an input/output (I/O) device;
   an operating system (OS) running on a virtual machine (VM) of the computing device;
   a device driver for the I/O device running on the VM;
   a virtual machine manager (VMM) running on the computing device;
   means for translating physical addresses of the computing device assigned to the OS to machine address of the I/O device, wherein the means for translating the physical addresses is hardware and is part of the computing device and is separate from the I/O device and the VMM; and,
   means for cooperatively interacting with the VMM to enable the device driver to receive direct-memory access (DMA) from the I/O device via the means for translating physical addresses to machine addresses, such that neither the means for cooperatively interacting nor the VMM alone enable the device driver to receive the DMA from the I/O device via the I/O translation hardware, wherein the means for cooperatively interacting runs on the VM and wherein the OS is unmodified to run on the VM of the computing device except for the hardware abstraction component being capable of cooperatively interacting with the VMM to enable the device driver to have DMA from the I/O device.

8. The computing device of claim 7, wherein the VMM is capable of permitting DMA from the I/O device to the device driver and of denying DMA from the I/O device to the device driver.

9. The computing device of claim 7, wherein the I/O device is reserved for the VM of the computing device and is unable to DMA to other VM's of the computing device.

10. The computing device of claim 7, wherein the I/O device is shared by the VM of the computing device with other VM's of the computing device for DMA.

11. A computing device comprising:
one or more input/output (I/O) devices;
one or more virtual machine (VM) environments, each VM environment comprising:
an operating system (OS), a device driver for the I/O device and a hardware abstraction component for the OS, all running within the one or more VM environments;
I/O translation hardware to translate physical addresses assigned to the OS of each VM environment to machine addresses of the I/O devices for direct-memory access (DMA) from at least one of the I/O devices to the device driver of each VM environment;
a virtual machine manager (VMM) to manage the VM environments, the VMM capable of permitting DMA from at least one of the I/O devices to the device driver of a VM environment and of denying DMA from the I/O devices to the device driver of a VM environment,
wherein the I/O translation hardware is part of the computing device and is separate from the VMM and from the I/O devices,
wherein the VMM is to permit DMA from at least one of the I/O devices to the device driver of a VM environment by cooperatively interacting with the hardware abstraction component of the VM environment to enable the device driver of the VM environment to receive direct-memory (DMA) access from at least one of the I/O devices via the I/O translation hardware, such that neither the hardware abstraction component nor the VMM alone enable the device driver to receive the DMA from the I/O device via the I/O translation hardware, and
wherein the OS of a VM environment is unmodified to run within the VM environment except for the hardware abstraction component being capable of cooperatively interacting with the VMM to enable the device to have DMA from at least one of the I/O devices.

12. The computing device of claim 11, wherein the VMM is to deny DMA from the I/O devices to the device driver of a VM environment by virtualizing all I/O between the device driver and the I/O devices in software of the VMM.

13. The computing device of claim 11, wherein the VMM comprises a VM kernel that interacts with the hardware abstraction component of a VM environment to enable the device driver to have DMA from at least one of the I/O devices via the I/O translation hardware.

14. The computing device of claim 11, wherein each I/O device is reserved for one of the VM environments and is able to be accessed only by the VM environment for which the I/O device is reserved.

15. The computing device of claim 11, wherein the I/O devices are shared by the one or more VM environments, such that each VM environment is capable of receiving DMA from each I/O device.

16. A method for direct memory access (DMA) from an input/output (I/O) device of a computing device to a virtual machine (VM) environment running within the computing device, comprising:

programming I/O translation hardware to translate physical addresses of the computing device assigned to the VM environment to machine addresses of the I/O device, by a VM manager (VMM) running on the computing device, the I/O translation hardware being part of the computing device and separate from both the VMM and the I/O device; and, DMA'ing from the I/O device to a device driver for the I/O device running within the VM environment via cooperative interaction between the VMM and a hardware abstraction component running within the VM environment, such that the I/O translation hardware translates the physical addresses provided by the device driver to the machine addresses of the I/O device, and vice-versa, and such that neither the hardware abstraction component nor the VMM alone enable the device driver to receive the DMA from the I/O device via the I/O translation hardware, wherein the hardware abstraction component is for an operating system running within the VM environment and that is unmodified to run within the VM of the environment except for the hardware abstraction component being capable of cooperatively interacting with the VMM to enable the device driver to receive DMA from the I/O device.

17. The method of claim 16, further initially comprising:
calling the hardware abstraction component running within the VM environment by the device driver; and,
validating that DMA is authorized for the device driver by the hardware abstraction component.

18. The method of claim 16, further initially comprising:
registering for DMA with the hardware abstraction component running within the VM environment by the device driver;
calling the VMM by the hardware abstraction component to determine whether the device driver is operating within the VM environment;
calling the VMM by the hardware abstraction component to set up DMA with the I/O device for the device driver; and,
enabling access to the machine addresses of the I/O device from the VM environment, by the VMM.

19. A method comprising:
calling a hardware abstraction component running within a virtual machine (VM) environment of a computing device by a device driver running within the VM environment to setup access by the device driver to an input/output (I/O) device of the computing device;
determining by the hardware abstraction component whether direct-memory access (DMA) from the I/O device to the device driver is enabled, by communicating with a VM manager (VMM) of the computing device;
where DMA is not enabled, the VMM virtualizing all I/O between the device driver and the I/O device in software of the VMM to emulate DMA between the device driver and the I/O device; and,
where DMA is enabled, the VMM programming an I/O translation hardware of the computing device to translate physical addresses of the computing device assigned to the VM environment to machine addresses of the I/O device, so that DMA occurs between the device driver and the I/O device via cooperative interaction between the VMM and the hardware abstraction component running within the VM environment such that neither the hardware abstraction component nor the VMM alone enable the device driver to receive the DMA from the I/O device via the I/O translation hardware, the I/O translation hardware being part of the computing device and separate from both the VMM and the I/O device, wherein the hardware abstraction component is for an operating system running within the VM environment and that is unmodified to run within the VM of the environment except for the hardware abstraction component being capable of cooperatively interacting with the VMM to enable the device driver to receive DMA from the I/O device.

20. The method of claim 19, further comprising, where DMA is enabled, DMA'ing from the I/O device to the device driver, such that the I/O translation hardware translates the physical addresses provided by the device driver to the machine addresses of the I/O device, and vice-versa.

21. The method of claim 19, further initially comprising:
registering for DMA with the hardware abstraction component, by the device driver;
calling the VMM by the hardware abstraction component to determine whether the device driver is operating within the VM environment;
calling the VMM by the hardware abstraction component to set up DMA with the I/O device for the device driver; and,
where DMA of the DMA is permitted for the VM environment, the VMM enabling access to the machine addresses of the I/O device from the VM environment.

22. The method of claim 19, wherein the I/O device is reserved for the VM environment and is unable to DMA other VM environments of the computing device.

23. The method of claim 19, wherein the I/O device is shared by the VM environment of with other VM environments of the computing device for DMA.

* * * * *